(12) United States Patent
Manesis

(10) Patent No.: US 7,458,757 B1
(45) Date of Patent: Dec. 2, 2008

(54) APPARATUS AND MEANS FOR SECURING LARGE CONSTRUCTION STRUCTURES TO A TRAILER FOR TRANSPORTATION

(75) Inventor: Daniel A. Manesis, Brookfield, WI (US)

(73) Assignee: Safety Concepts, LLC, West Allis, WI (US)

( * ) Notice: Subject to any disclaimer, the term of this patent is extended or adjusted under 35 U.S.C. 154(b) by 0 days.

(21) Appl. No.: 11/959,611

(22) Filed: Dec. 19, 2007

(51) Int. Cl.
*B60P 7/08* (2006.01)
(52) U.S. Cl. .......................... 410/100; 410/44; 410/97; 410/99; 410/120
(58) Field of Classification Search .................. 410/32, 410/34, 41, 44, 50, 97, 100, 99, 120; 24/299; 105/355; 248/499
See application file for complete search history.

(56) References Cited

U.S. PATENT DOCUMENTS

| | | | |
|---|---|---|---|
| 1,638,612 A | 8/1927 | Baus | |
| 1,849,692 A | 3/1932 | Romine | |
| 2,873,694 A | 2/1959 | Jaskowiak | |
| 3,193,122 A | 7/1965 | Sauthoff | |
| 3,580,187 A | 5/1971 | Marks | |
| 4,487,537 A * | 12/1984 | Morse | 410/47 |
| 4,526,500 A | 7/1985 | Patrick | |
| 4,770,578 A | 9/1988 | Coleman | |
| 5,382,123 A | 1/1995 | Dawson | |
| 6,227,780 B1 | 5/2001 | Stewart et al. | |

* cited by examiner

*Primary Examiner*—Stephen Gordon
(74) *Attorney, Agent, or Firm*—John K. McCormick

(57) ABSTRACT

An apparatus for securing construction structure loads to a trailer for transportation which employs adjustable tubes, tie down chains, chain binders, load pads and protective flanges. The load pads being the apparatus for transferring the tie down forces to the construction structure load and trailer bed without damaging the load. The protective flanges being the apparatus for preventing the load chains from damaging the edges of the construction structure load when the load is secured. The apparatus is placed on the top of a load with the load chains secured to the trailer at a vertical angle. The chain binders tighten the apparatus down on the load creating greater clamping force between the load and the trailer bed.

12 Claims, 5 Drawing Sheets

APPARATUS AND MEANS FOR SECURING LARGE CONSTRUCTION STRUCTURES TO A TRAILER FOR TRANSPORTATION

FIELD OF THE INVENTION

The present invention relates to an apparatus and system for a controlled pressure friction base fastening fixture for safely securing large construction structures, such as pre-stressed concrete structures and the like, onto railroad and/or tractor trailer beds for secure transportation from a fabrication site to the construction site or point of use location.

BACKGROUND OF THE INVENTION

The use of tie-down systems, whether strap type, chain type or other, in the securing and transportation of large loads is well known in the art. Chain type tie-downs are typically utilized on heavy and/or rolling loads, or on loads that can withstand the tie-down tightening process with out undue damage to the goods being secured, such as for securing construction equipment, automobiles, machinery, steel piping, logs and the like. Once the chain is attached to both the object being secured and to the trailer bed, a ratcheting mechanism is the utilized to tighten the chain in order to securely tie the load to the trailer bed. The chain type tie-downs can withstand high tie-down tension with little or no elasticity in the chain itself.

Strap type tie-downs are secured in a manner similar to the chain type tie-downs but are more elastic in nature and tend to elastically stretch when put under tension. This provides a cushioning securing means to the load being secured. The strap type of securing means is more commonly used on crated or boxed loads, or loads that are lighter in weight and required less tension to adequately secure them to a trailer.

With either type of tie-down, a plurality of the chain or strap tie-downs is typically placed over the top of the load to be secured, and then secured to the side edges of the trailer. This secures the load from shifting to either side of the trailer during transportation. Additional chains or straps are used to secure the load to the front and rear of the trailer to prevent the load from sliding forward or backward on the trailer during transportation.

Specific tie-down arrangements for specialized applications have been developed for a variety of reasons and products. U.S. Pat. No. 5,382,123 issued to Dawson on Jan. 17, 1995 provides a device for securing stacked lumber on a trailer for transportation. The device includes a convex shaped element that deforms under tie-down strap pressure so as to provide uniform engagement with the individual elements of lumber on the top surface of the load.

U.S. Pat. No. 4,526,500 to Patrick, issued on Jul. 2, 1995 discloses a protective member for securing metal coils to a trailer utilizing releasable chain or cable retaining means. The protection member lies between the chain or cable and the metal coil in order to prevent damage by the chain or cable to the edges of the metal coil. U.S. Pat. No. 4,770,578 to Coleman, issued Sep. 13, 1988 discloses an arrangement for securing bins to trailers utilizing a tie-down frame.

While these and other tie-down systems are generally effective for their intended purposes, they are inadequate when it comes to securing large construction structures such as pre-stressed or preformed concrete structures. Pre-stressed concrete structures are designed and manufactured to support a vertical load only. If the edges of the top surface of the pre-stressed concrete structure are chipped or damaged in any way, the chipping or damage destroys the integrity of the structure and, as a result, the entire structure must be disposed of as scrap at a loss of tens or hundreds of thousands of dollars plus the cost and disruption to traffic caused by removing the pre-stressed concrete to a disposal site.

Given these concerns, the current method of transporting large construction structures is to lay them on a trailer and allow the friction between the trailer and the weight of the construction structure load to be the primary means of securing the load to the trailer. Chains are utilized only at the front and rear of the trailer and structure in order to try and prevent the structure from sliding forward or backward.

Given a construction structure load can weigh anywhere between 15 to 40 tons or more, the friction does provide some securing means on the load to the trailer. However, every year there are multiple instances, in multiple states, wherein the load loses its frictional resistance to the trailer and falls off of the trailer. The front and rear chains providing little if any real securing means. This results in not only the expensive loss of the structure itself, but the costs to remove the structure and dispose of it. In addition, every year there are instances where people are crushed to death or vehicles are destroyed by the structure falling off of the transport trailers.

Therefore, a need exists to for a more reliable and safer means for securing large construction structures to a trailer for transportation that does not damage the construction structure and better secures the load to the trailer.

SUMMARY OF THE INVENTION

In view of the foregoing hazards and disadvantages inherent in the present means for transporting large construction loads, the present invention provides a new means for better securing large construction loads, including pre-stressed concrete structures, for transportation.

The general purpose of the present invention is two fold. The first purpose is to provide a better means for securing a large construction load to a trailer to prevent the load from falling off of the trailer unnecessarily. A second purpose is to provide a securing means that does not cause damage to the construction structure during the securing and transportation process.

To accomplish this, the present invention generally comprises a pair of rigid square hollow outer tubes and four square hollow inner tubes that are slideably placed inside of the ends of the two outer tubes. The inner tubes can be slid in or out of the outer tubes to a desired overall length. The inner tubes are then temporarily fixed in place to the outer tubes by the use of locking pins. Fixedly attached to the outer ends of the inner tubes are protective flanges that prevent the load chains from coming in contact with any construction structure load, thereby avoiding damage to the structure.

Load chains are then adjustably connected to the outer tubes and exit the inner tubes for tie down to a trailer. Removably attached to the bottom of the outer tubes are load pads. The load pads are of sufficient height to prevent the inner or outer tubes from contacting the construction structure load when the load chains are tightened down. In addition, the load pads are made of a material that has good compressibility and shape retention such that a large pressure can be placed on the load pads without damaging the load.

There has been thus outlined, rather broadly, the more important features of the invention in order that the detailed description that follows may be better understood, and in that the present contribution to the state of the art may be better appreciated. In this respect, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the terminology employed herein are for the purpose of description and should not be regarded as limiting.

As such, those skilled in the art will appreciate that the conception, upon which this disclosure is based, may readily be utilized as a basis for designing other structures, methods and systems for carrying out the several purposes of the present invention. It is important, therefore, that the claims be regarded as including such equivalent constructions insofar as they do not depart from the spirit and scope of the present invention.

It is therefore an object of this invention to provide a new means for securing construction structure loads to a trailer for transportation.

It is a further object of this invention to provide a new means for securing construction structure loads, including pre-stressed concrete loads, to a trailer that prevents damage to the load.

It is a further object of this invention to provide a securing means that is easily manufactured and installed.

It is a further object of this invention to provide a securing means that is durable in construction and reliable in use.

It is a further object of this invention that it is cost effective.

These, along with other objects of the invention, along with the various features of novelty which characterize the invention, are pointed out with particularity in the claims annexed to and forming a part of this disclosure.

BRIEF DESCRIPTION OF THE DRAWINGS

The invention will be better understood, and objects other than those set forth above, will become more apparent when considered with the following detailed description taken in conjunction with the drawings wherein.

DETAILED DESCRIPTION OF THE PREFERRED EMBODIMENTS

Figure 1:
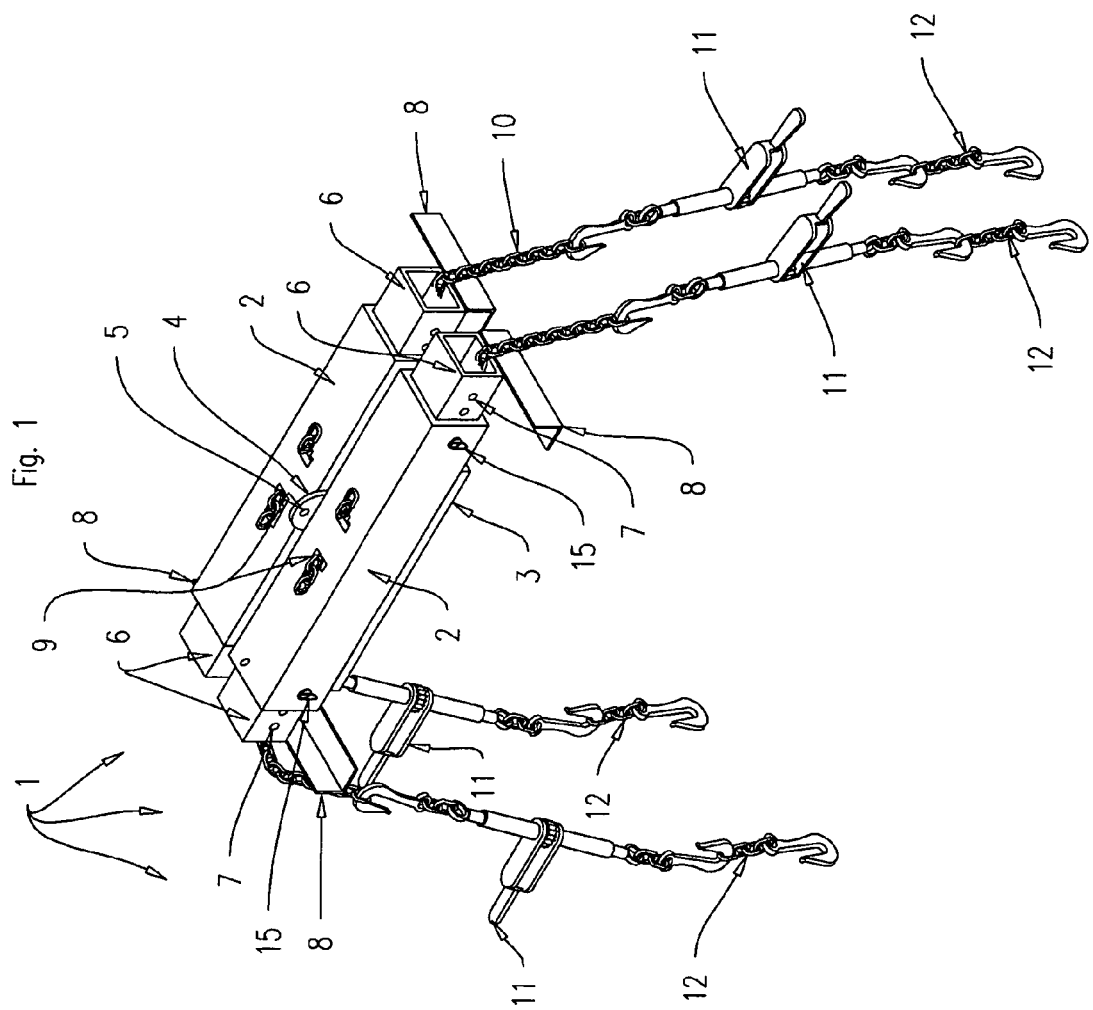
FIG. 1 is a perspective view of the preferred embodiment of the present invention.

The preferred embodiments illustrated are not intended to be exhaustive or to limit the invention to the precise forms disclosed. Rather, they are illustrated and described to explain the principles of the invention and its practical use, to thereby enable others skilled in the art to utilize this invention. Furthermore, the invention as described and drawn utilizes a pre-stressed concrete load for explaining how the invention operates and functions, however, it is to be understood that the use of the pre-stressed concrete load example is not meant to limit the invention to pre-stress concrete structures as the invention can be easily and readily applied to construction structures that are not pre-stressed concrete. In addition, the pre-stressed concrete structure used in the explanation is what is know in the art as a "double T" structure and is only meant to as an aide in explaining the invention in detail, thus the double T structure is not meant to limit the invention to that structure, but rather to encompass all such large construction structures to which the securing apparatus applies.

With reference now the drawings, wherein like reference numerals designate like or corresponding parts throughout the several views thereof, a securing device 1 is illustrated which forms a first embodiment of the present invention.

Figure 2:
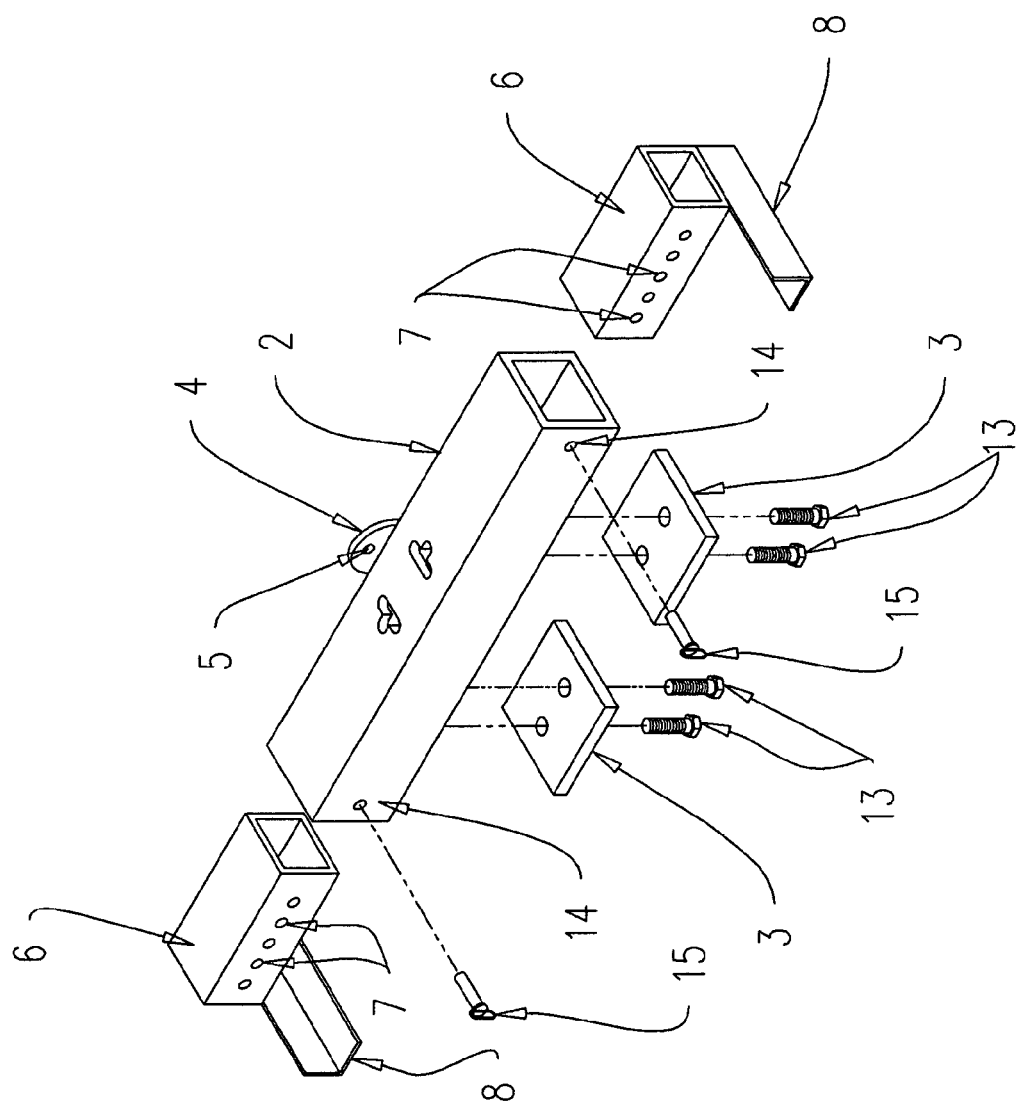
FIG. 2 is an exploded perspective view of a portion of the present invention.

FIGS. 1 and 2 depict a first preferred embodiment of the securing apparatus 1 of the present invention. The securing apparatus 1 comprises two (2) horizontal outer square hollow tubes 2, preferable of steel or other rigid material, which are fixedly connected to each other by a lifting plate 4. The lifting plate 4 has a lifting hole 5 for the placement and removal of the securing apparatus 1 onto or off of a concrete structure 17 shown in FIGS. 3 and 4. On the top of each outer tube 2 are two (2) chain openings 9 for receiving and removably securing one end of a first load retaining chain 10. Proximate each end of the outer tubes 2 is a locking pin hole 14 (shown in FIGS. 2 and 5). Slideably inserted into the two open ends of each of the outer tubes 2 are inner square hollow tubes 6, preferably made of steel or other rigid material. There are a plurality of locking pin holes 7 located on the vertical sides of each of the inner tubes 6. Locking pins 15 are utilized to secure in the inner tube 6 to the outer tube 2 through the locking pin holes 7 and 14, thereby determining and fixing the overall width of the apparatus 1.

On the bottom horizontal surface on each of the outer tubes 2 are two resilient load pads 3 that are removably attached to the outer tubes 2. The load pads 3 being made preferably of oak, maple, polypropylene or the like. At the exposed end of each of the inner hollow tubes 6, fixedly attached to the bottom surface of the inner hollow tube 6, is a protection flange 8, preferably made of steel or other rigid material. Load retaining chains 10 being secured at one end of the chain 10 to one of the chain openings 9 and running through and out of the inside of the inner hollow tube 6. A chain load binder 11, of the kind commonly known in the art, being attached at a first end to the second end of the load chain 10 and at the second end to a first end of a second load chain 12. The second end of the second load chain 12 being then attached to the trailer 16 (as shown in FIGS. 3 and 4).

Figure 3:
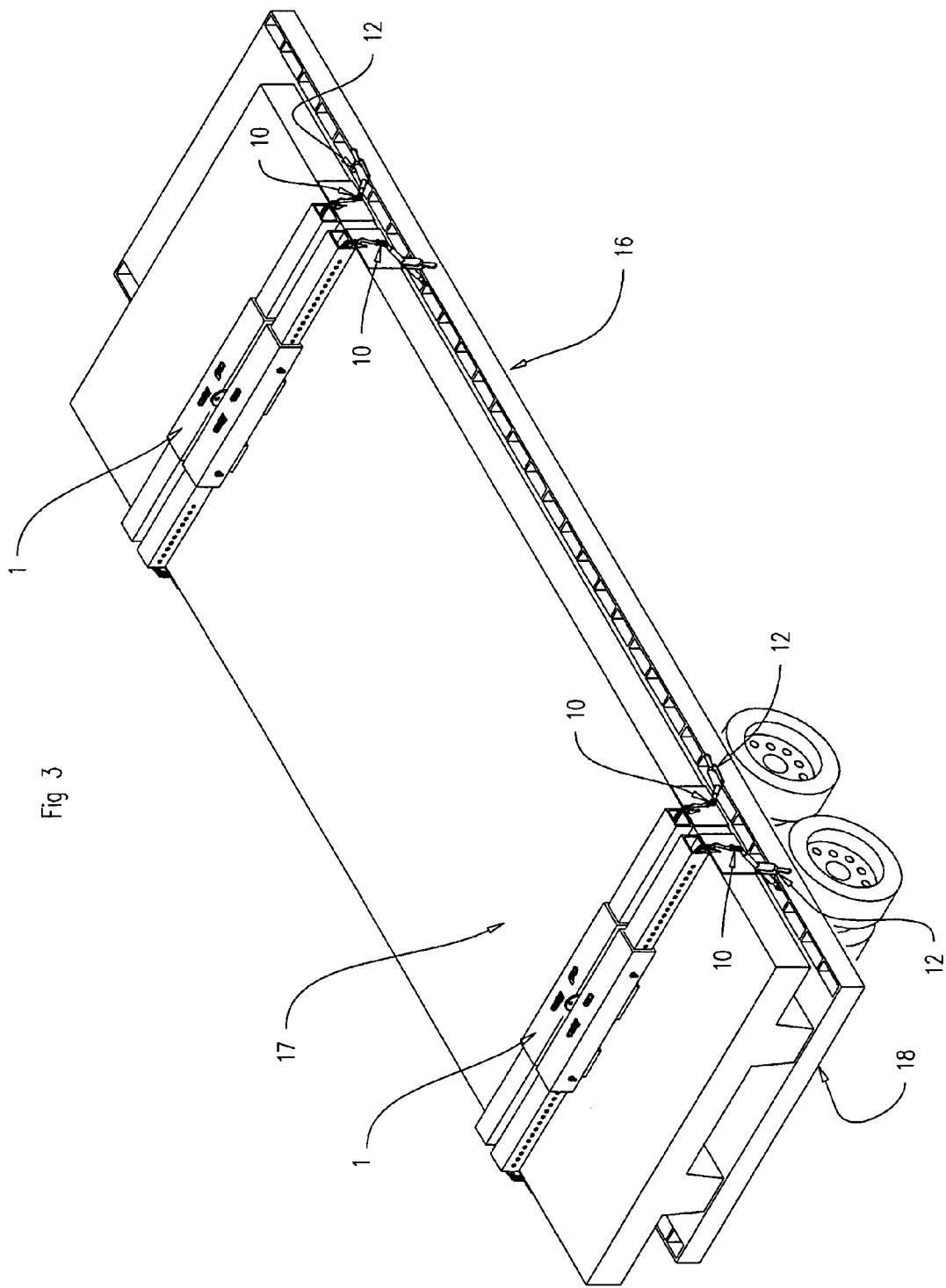
FIG. 3 is a perspective view of the present invention as mounted on a load and trailer.
Figure 4:
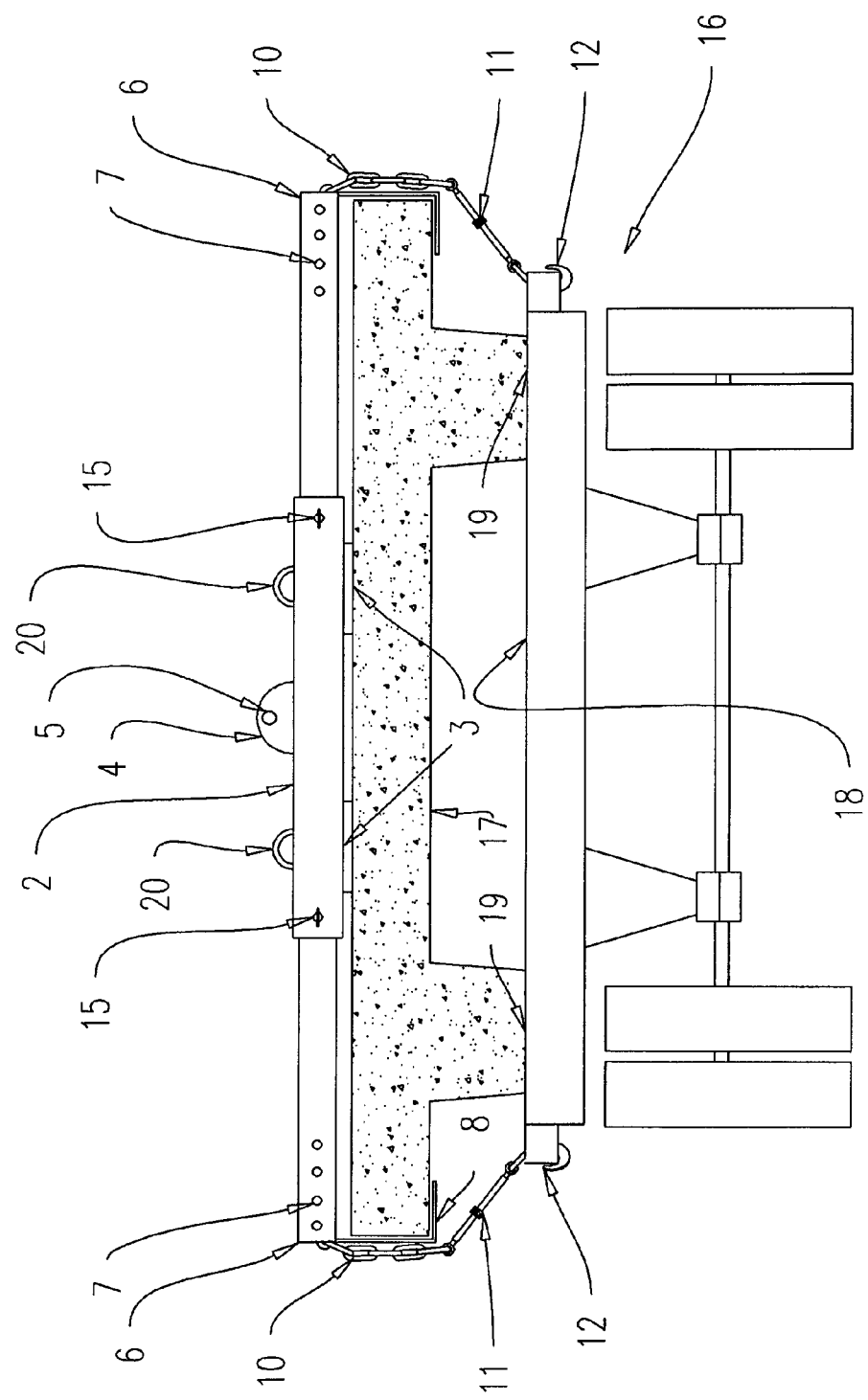
FIG. 4 is an end planar view of the present invention mounted on a load and trailer.

As depicted in FIGS. 3 and 4, there is a trailer 16 having a trailer bed 18. Placed on top of the trailer bed 18 is one style of pre-stressed concrete structure 17 used in construction. Other shapes are commonly known in the art and will not detract or limit the scope of the invention. The typical means of securing the concrete structure 17 to the trailer 16 is by taking advantage of the friction caused by the weight of the concrete structure 17 on the bed of trailer 18 at the surfaces of contact 19. Load chains (not shown) can be attached to the front and rear ends of the trailer 16 and the front and rear ends of the pre-stressed concrete load 17 as is currently done.

In use, an operator places one or more securing apparatus' 1 to the top of a pre-stressed concrete structure 17. The inner tubes 6 are then slid inward or out of the outer tubes 2 such that the protection flanges 8 extend slightly beyond the edges of the pre-stressed concrete structure 17. The load chains 10 and 12 and chain binder 11 are then utilized to secure the securing apparatus 1 to the trailer frame 16 by tightening down the load chain binders 11. As the load chains 10 and 12 tighten down on the securing apparatus 1, the load pads 3 transmit the force of tightening to the top of the pre-stressed concrete load 17. This force is transmitted through the pre-stressed concrete structure 17 and increases the frictional force between the pre-stressed concrete load 17 and the trailer bed 18 at the surfaces of contact 19.

As the securing apparatus 1 is tightened down, the edges of the pre-stressed concrete load 17 are protected from damage by the load chains 10 and 12 and from the load binder 11 by the protection flanges 8. In addition, as there may be some deflection of either the inner or outer tubes 6 and 2 respectively, depending upon the amount of tightening force applied to the load chains 10 and 12, the load pads 3 are of sufficient height to prevent the inner or outer tubes 6 and 2 from contacting the pre-stressed concrete structure 17 and causing damage to the edges of the pre-stressed concrete structure 17.

In addition, as depicted in FIG. 4, the pre-stressed concrete load 17 has a plurality of lifting loops 20, typically formed of steel that are as part of the pre-stressed concrete structure 17 as is known in the art. These loops 20 are typically utilized for lifting and moving the pre-stressed concrete structure 17. However, by placing the securing apparatus 1 over the loops 20 such that the loops protrude between the two outer tubes 2, tapered wedges (not shown) or other securing means can be driven into the loops 20 and against the top surface of the outer tubes 2 thereby providing additional means for securing the securing apparatus 1 to the pre-stressed concrete load 17.

In its preferred mode, as depicted in FIG. 3, the load chains 10 and 12 are positioned at an angle when installed. Thus, during transit, if the pre-stressed concrete load 17 starts to lose frictional immobility relative to the trailer bed 18, any movement of the concrete load 17 causes the securing apparatus 1 and load chains 10 and 12 to apply greater pressure to the pre-stressed concrete load 17 thereby preventing any further movement of the pre-stressed concrete load 17.

In a further embodiment of the invention, only one side of the securing apparatus 1 would have first and second load chains 10 and 12 and chain binders 11. The other side would have load chain (not shown) that attaches at a first end to one of the chain openings 9 in the outer tubes 2 at to the trailer 16 at the second end. Tightening down the load chains 10 and 12 on the one side would tighten down the entire securing apparatus 1.

Figure 5:
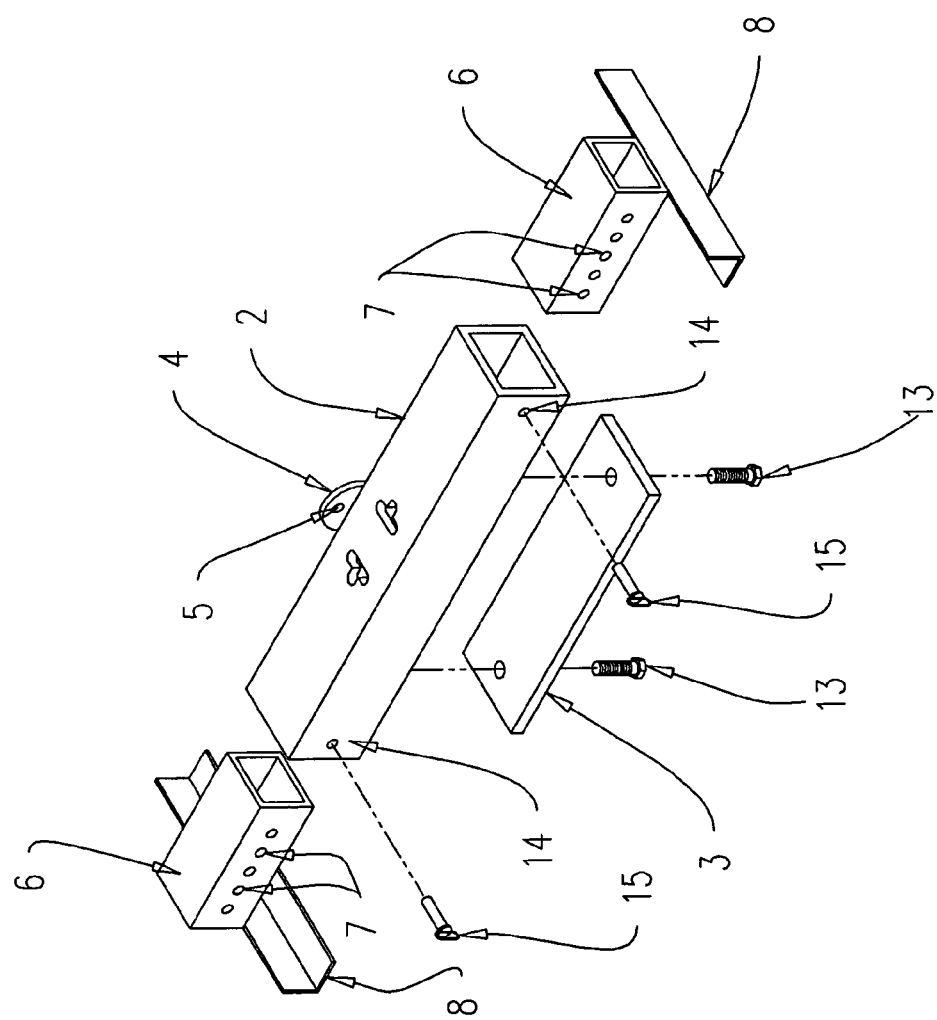
FIG. 5 is an exploded view of an alternate embodiment of the present invention.

In an alternative embodiment, as depicted in FIG. 5, in place of the two (2) outer tubes 2 and four (4) inner tubes 6 there is only a single outer tube 2 and two (2) inner tubes 6. The protection flanges 8 have been modified by extending the protection flange in both directions to protect the pre-stressed concrete structures 17 from any damage from the load chains 10 and 12 and/or the load chain binder 11. In this embodiment, the load chains 10 and 12 would be in a straight vertical plane to the trailer bed 18. During transit, if the pre-stressed concrete load 17 starts to lose frictional immobility relative to the trailer bed 18, any movement of the concrete load 17 causes the securing apparatus 1 and load chains 10 and 12 to apply greater pressure to the pre-stressed concrete load 17 thereby preventing any further movement of the pre-stressed concrete load 17. As depicted in FIG. 5, only one load pad 3 is utilized.

With respect to the above description, it is to be realized that the specific location and number of load pads 3 and other dimensional relationships for the parts of the invention, which includes variations in size, materials, form, shape and manner of operation are deemed readily apparent to one skilled in the art for the present invention's application to similar or differing shapes, sizes, weights and configurations of pre-stressed concrete loads 17 or other loads to which this invention may apply.

Therefore, the foregoing is considered as illustrative only of the principles of the invention. Further, since numerous modifications and changes will readily occur to those skilled in the art, it is not desired to limit the invention to the exact construction and operation shown and described, but to include all modifications and equivalents falling within the scope of the invention as defined by the appended claims.

I claim:

1. An apparatus for securing a construction structure to a flatbed, said apparatus comprising:

an outer horizontal tube, said outer tube having a lifting plate, said lifting plate having a lifting hole, said lifting plate being fixedly attached to said outer tube and said outer tube having two chain openings for securing a first and second load chain, one of said load chains in each said opening of said outer tube, said outer tube having two locking pin holes, one of said holes proximate each end of said outer tube;

two inner tubes slideably attached to said outer tube, one of said inner tubes in each end of said outer tube, said inner tubes having a plurality of locking pin holes;

a protection flange fixedly attached to an outer end of each of said inner tubes;

removable locking pins to temporarily secure said inner tubes to said outer tube in a fixed position by inserting said locking pins into said locking pin holes in said inner and outer tubes;

a first resilient load pad removably attached to the bottom of said outer tube;

said first load chain being secured at a first end to said outer tube in one of said chain openings and traversing inside of said outer tube and one of said inner tubes past a respective one of said protective flanges with a hooking mechanism on a second end of said first load chain;

said second load chain being secured at a first end to said outer tube in one of said chain openings and traversing inside of said outer tube and one of said inner tubes past a respective one of said protective flanges;

a chain tensioner removably attached at a first end to a second end of said second load chain; and a second end of said chain tensioner attached to a first end of a third load chain, said third load chain having a hooking mechanism at a second end of said third load chain.

2. The apparatus of claim 1 wherein a second chain tensioner is attached at a first end to said second end of said first load chain and a fourth load chain is attached at a first end to a second end of said second chain tensioner with a hooking mechanism on a second end of said fourth load chain.

3. The apparatus of claim 1 wherein there are a plurality of resilient load pads which include said first resilient load pad and are removably attached to the bottom of said outer tube.

4. The apparatus of claim 1 wherein said inner and outer tubes are square tubes.

5. The apparatus of claim 1 wherein said inner and said outer tubes are rectangular tubes.

6. The apparatus of claim 1 wherein said construction structure is a pre-stressed concrete construction structure.

7. An apparatus for securing a construction structure to a flatbed, said apparatus comprising:

two outer horizontal tubes, said outer tubes being fixedly attached to each other by a lifting plate between said two outer tubes, said lifting plate having a lifting hole, said outer tubes each having two chain openings for securing first and a second load chains, one of said load chains in each said opening in said outer tubes, said outer tubes each having two locking pin holes, one of said holes proximate each end of said outer tubes;

four of said inner tubes slideably attached to said outer tubes, one inner tube in each end of said outer tubes, said inner tubes having a plurality of locking pin holes;

a protection flange fixedly attached to an outer end of each of said inner tubes;

removable locking pins to temporarily secure said inner tubes to said outer tubes in a fixed position by inserting said locking pins into said locking pin holes in both said inner and outer tubes;

first resilient load pads removably attached to the bottom of said outer tubes;

said first load chains being secured at a first end to said outer tubes in one of said chain openings and traversing inside of said outer tubes and respective ones of said inner tubes past respective ones of said protective flanges with a hooking mechanism on a second end of each said first load chain;

said second load chains being secured at a first end to said outer tubes in one of said chain openings and traversing inside of said outer tubes and respective ones of said inner tubes past said respective ones of said protective flanges;

a chain tensioner removably attached at a first end to the second end of each of said second load chains; and a second end of each of said chain tensioners attached to a first end of a third load chain, said third load chains having a hooking mechanism at a second end of each of said third load chains.

8. The apparatus of claim 7 wherein additional chain tensioners are attached at a first end to said second end of each of said first load chains and fourth load chains are attached at a first end to a second end of said additional chain tensioners with a hooking mechanism on a second end of each of said fourth load chains.

9. The apparatus of claim 7 wherein there are a plurality of resilient load pads which include said first resilient load pads and are removably attached to the bottom of each of said outer tubes.

10. The apparatus of claim 7 wherein said inner and outer tubes are square tubes.

11. The apparatus of claim 7 wherein said inner and said outer tubes are rectangular tubes.

12. The apparatus of claim 7 wherein said construction structure is a pre-stressed concrete structure.

* * * * *